(12) United States Patent
Hamada et al.

(10) Patent No.: US 9,865,942 B2
(45) Date of Patent: Jan. 9, 2018

(54) SHIELD WIRE WITH TERMINAL FITTING

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Kazuaki Hamada, Mie (JP); Shigeto Katou, Mie (JP); Shiho Maetani, Mie (JP)

(73) Assignees: AUTONETWORKS TECHNOLOGIES, LTD. (JP); SUMITOMO WIRING SYSTEMS, LTD. (JP); SUMITOMO ELECTRIC INDUSTRIES, LTD. (JP)

( * ) Notice: Subject to any disclaimer, the term of this patent is extended or adjusted under 35 U.S.C. 154(b) by 0 days.

(21) Appl. No.: 15/314,310

(22) PCT Filed: May 22, 2015

(86) PCT No.: PCT/JP2015/064712
§ 371 (c)(1),
(2) Date: Nov. 28, 2016

(87) PCT Pub. No.: WO2015/182500
PCT Pub. Date: Dec. 3, 2015

(65) Prior Publication Data
US 2017/0214153 A1   Jul. 27, 2017

(30) Foreign Application Priority Data
May 28, 2014   (JP) .................................. 2014-109922

(51) Int. Cl.
*H01R 9/05* (2006.01)
*H01R 4/20* (2006.01)
(Continued)

(52) U.S. Cl.
CPC .............. *H01R 9/0518* (2013.01); *H01R 4/20* (2013.01); *H01R 24/56* (2013.01); *H02G 15/025* (2013.01)

(58) Field of Classification Search
CPC ..................................................... H01R 9/0518
See application file for complete search history.

(56) References Cited

U.S. PATENT DOCUMENTS 1,687,574 A * 10/1928 Liss ....................... B21D 53/36
192/125 B
2,293,491 A *  8/1942 Cox .................... B21C 37/0826
29/521

(Continued)

FOREIGN PATENT DOCUMENTS

| JP | 2002-10469 | 1/2002 |
| JP | 2002-218622 | 8/2002 |
| JP | 2012-125009 | 6/2012 |

OTHER PUBLICATIONS

International Search Report dated Aug. 18, 2015.

*Primary Examiner* — James Harvey
(74) *Attorney, Agent, or Firm* — Gerald E. Hespos; Michael J. Porco; Matthew T. Hespos

(57) ABSTRACT

A shield wire for use with a terminal fitting has a ring (7) is fit laterally to an outer cover (4), and a braided wire (3) is folded onto an outer peripheral surface of the ring (7). A hooking edge (9) protrudes over the entire circumference on a front end part of the ring (7). A barrel (15) of an outer conductor terminal (12) is crimped to the folded braided wire (3). Thus, the hooking edge (9) of the ring (7) is widened into a horn shape to form a bell-mouth (16) with the braided wire (3) hooked to the hooking edge (9). Thus, a hooked sate of the braided wire (3) and the ring (7) is strengthened, so that a holding force of a terminal fitting (T) onto a shield wire (S) is enhanced.

6 Claims, 4 Drawing Sheets

(51) Int. Cl.
    *H02G 15/02*    (2006.01)
    *H01R 24/56*    (2011.01)

(56) References Cited

U.S. PATENT DOCUMENTS

| | | | | |
|---|---|---|---|---|
| 3,103,548 A | * | 9/1963 | Concelman | H01R 24/40 |
| | | | | 174/75 C |
| 4,280,749 A | * | 7/1981 | Hemmer | H01R 24/40 |
| | | | | 174/89 |
| 4,596,440 A | * | 6/1986 | Quam | H01R 13/17 |
| | | | | 439/827 |
| 5,123,864 A | * | 6/1992 | Karlovich | H01R 4/184 |
| | | | | 439/585 |
| 2001/0053633 A1 | | 12/2001 | Konda | |
| 2002/0106918 A1 | | 8/2002 | Saito et al. | |
| 2012/0190238 A1 | * | 7/2012 | Omae | H01R 13/6592 |
| | | | | 439/620.01 |
| 2013/0337705 A1 | * | 12/2013 | Kalayjian | H01R 9/0518 |
| | | | | 439/889 |
| 2015/0129297 A1 | * | 5/2015 | Hanazaki | H01R 4/20 |
| | | | | 174/393 |

\* cited by examiner

# SHIELD WIRE WITH TERMINAL FITTING

BACKGROUND

1. Field of the Invention

The present invention relates to a shield wire with terminal fitting.

2. Description of the Related Art

Japanese Unexamined Patent Publication No. 2002-218622 discloses a known shield wire with terminal fitting. The shield wire disclosed here is configured such that a core is covered with an inner cover. The outer periphery of this inner cover is covered with a braided wire and the outer periphery of the braided wire is covered with an outer cover. Prior to connection to a terminal fitting, an end part of the outer cover is removed over a predetermined length range to expose the braided wire. Subsequently, the terminal fitting (shield terminal) formed into a tubular shape is fit to the outer cover of the shield wire and the exposed braided wire is folded onto the outer peripheral surface of this terminal fitting. By crimping a tightening ring from above the braided wire, the mounting of the terminal fitting on the shield wire is completed.

In the shield wire with terminal fitting described above, the folded braided wire is sandwiched and held between the terminal fitting and the tightening ring. However, these surfaces sandwiching the braided wire are both flat surfaces free from unevenness and nothing is set to hook the braided wire. Thus, the terminal fitting may move on the outer cover of the wire and it is difficult to fix the terminal fitting at a predetermined position of the braided wire. As just described, the conventional shield wire with terminal fitting has problems that a fixing force of the terminal fitting to the shield wire is small and a tightened state of the terminal fitting is not stable.

The present invention was completed based on the above situation and aims to provide a shield wire with terminal fitting capable of enhancing a fixing force of a terminal fitting to a shield wire and stabilizing a tightened state of the terminal fitting to the shield wire.

SUMMARY

The present invention is directed to a shield wire with terminal fitting in which a terminal fitting is mounted on an end part of a shield wire having a braided wire interposed between an outer cover and an inner cover. The shielded wire includes an outer-cover removed portion configured to expose the braided wire by having an end part of the outer cover removed. A ring made of electrically conductive metal and includes a main body formed into a substantially tubular shape that can fit to an outer peripheral surface of a part of the outer cover near the outer-cover removed portion. The ring also has a hooking edge formed to project out while extending in a circumferential direction on a tip part of the main body. A braided-wire folded portion is formed by folding a part of the braided wire exposed at the outer-cover removed portion onto the outer peripheral surface side of the ring member beyond the hooking edge. A barrel is formed on the terminal fitting and is to be crimped to tighten an outer peripheral surface of the braided-wire folded portion at a position corresponding to the main body of the ring.

According to the present invention, the braided wire is tightened by crimping the barrel after passing over the hooking edge formed to project on the tip part of the ring member. Thus, even if a tensile force acts on the wire, the braided wire is hooked to the hooking edge so that the holding of the terminal fitting on the wire can be strengthened.

A split groove may be provided over the entire length on a side surface of the ring and the ring may be formed to fit to the shield wire in a direction intersecting an axial direction of the shield wire. If the split groove is not provided, it is cumbersome to fit the ring to the shield wire along the axial direction from the tip of the shield wire. However, according to the above configuration, the ring can be fit to the shield wire in the direction intersecting with the axial direction. Thus, the ring member can be mounted easily The barrel is formed by two barrel pieces and is formed into a substantially tubular shape by butting leading edges of the barrel pieces against each other over the entire length when being crimped to tighten the braided-wire folded portion. A slit is formed between the butting leading edges of the barrel pieces and includes a part extending in a direction intersecting with a folding direction of the braided wire. If the braided-wire folded portion is on an end part of the braided wire, a braided state is released easily to cause fraying. If the barrel is crimped in such a state, strands may protrude from a boundary between the butting parts of the barrel pieces. However, in the above configuration, the butting parts of both barrel pieces are configured to include parts extending in the direction intersecting with the folding direction of the braided wire. Thus, the protrusion of the frayed strands can be effectively suppressed.

An end part of the ring including the hooking edge may be widened and deformed into a horn shape to form a bell-mouth as the barrel is crimped. Thus, the end part of the ring that includes the hooking edge is widened and deformed to form the bell-mouth as the barrel portion is crimped. That is, since a projection amount of the hooking edge from the main body of the ring member further increases by the crimping of the barrel, hooking to the braided-wire folded portion is strengthened. Thus, the terminal fitting is held more reliably held on the wire.

The rear end positions of the barrel and the ring may substantially align in a folding direction of the braided-wire folded portion. Thus, the barrel is positioned with respect to the ring in the folding direction of the braided-wire folded portion. Therefore, the crimped position (area) of the barrel with respect to the ring is stabilized, and the form of the bell-mouth or the form of the narrow portion is uniform.

An end part of the barrel on a side corresponding to the hooking edge may be bent inward along a circumferential direction to form a narrow portion. Accordingly, when the barrel is crimped, the braided-wire folded portion is pressed toward the ring at a position beyond the hooking edge. Thus, the braided wire is hooked to the hooking edge in a strongly tense state so that the terminal fitting is held reliably on the wire.

DETAILED DESCRIPTION

Figure 1A:
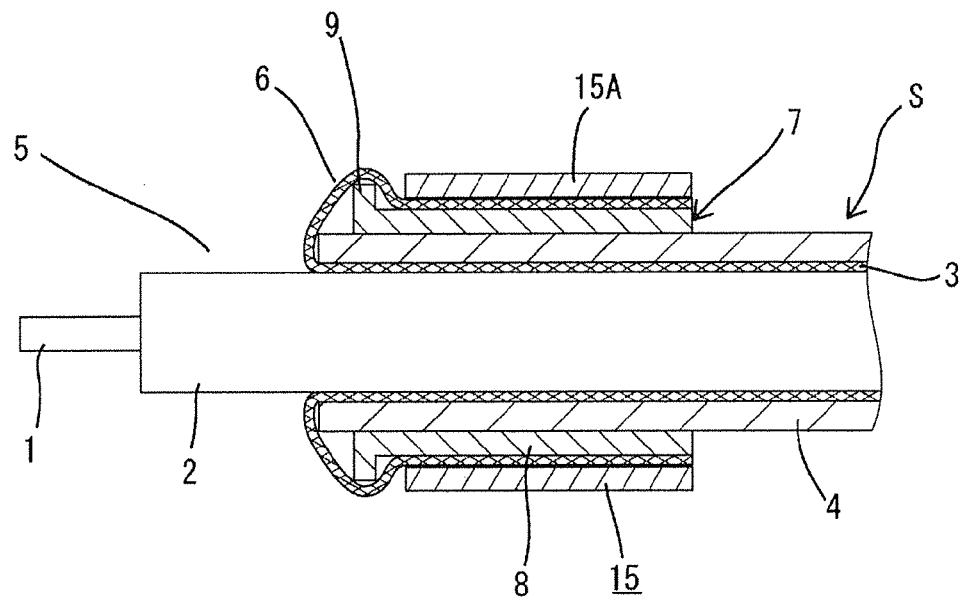
FIG. 1(A) is a section of a first embodiment showing a state immediately before a barrel portion of an outer conductor is crimped to a shield wire.

Next, first and second specific embodiments of a shield wire with terminal fitting of the present invention are described with reference to the drawings.

FIGS. 1 and 2 show a shield wire S with terminal fitting according to the first embodiment of the present invention. The shield wire S includes a core 1 provided along a center axis, and the outside of the core 1 is covered by an inner cover 2 formed of an insulating material. The inner cover 2 is covered by a braided wire 3 formed into a tubular shape by braiding a multitude of electrically conductive metal strands, and the outside of the braided wire 3 is covered by an outer cover 4 made of a resilient insulating material. The shield wire S has the outer cover 4 removed at an end part thereof, thereby forming an outer-cover removed portion 5, and an end part of the braided wire 3 is exposed at this outer-cover removed portion 5. The exposed braided wire 3 is folded backwardly and mounted on the outer cover 4 in connecting the shield wire S with a terminal fitting T. Hereinafter, this part of the braided wire 3 folded onto the outer cover 4 is referred to as a braided-wire folded portion 6.

Next, the process of connecting the shield wire S and the terminal fitting T is described with reference to FIGS. 2(A) to (E).

Figure 2A:
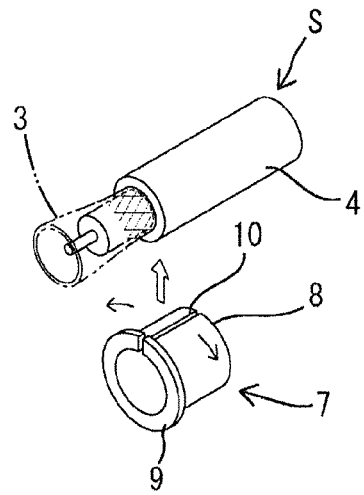
FIGS. 2(A) to 2(E) are views successively showing a process of connecting a terminal fitting to the shield wire.
Figure 2B:
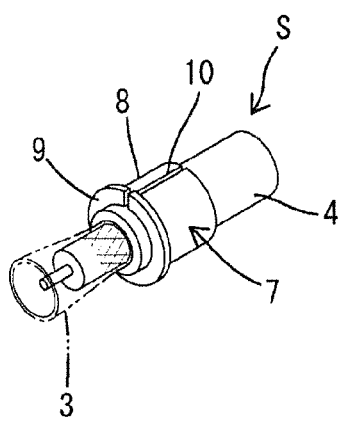

First, prior to the aforementioned folding of the braided wire 3, a ring 7 made of electrically conductive metal (e.g. made of brass) is fitted on an end part (front end part) of the outer cover 4 (see FIGS. 2(A) and 2(B)). As shown in FIG. 2(A), the ring 7 is integrally formed of a main body 8 having a cylindrical shape and a hooking edge 9 is formed on one end side (front end side) of this main body 8.

The main body 8 is formed to have such an inner diameter as to fit in close contact with (may be press-fitted to) the outer peripheral surface of the outer cover 4. Further, the hooking edge 9 is formed to protrude like a flange along the entire circumference of the main body 8. The hooking edge 9 is formed by bending a leading edge of the main body 8 out substantially at a right angle.

The ring 7 is cut to form a split groove 10 extending over the entire length range including the hooking edge 9 and along an axial direction, and the entire ring 7 can be opened and closed with the split groove 10 as a boundary. In this way, the ring 7 is fit to the outer cover 4 of the shield wire S laterally (in a direction perpendicular to an axis of the shield wire S). In this fitted state, the front end of the ring 7 is located slightly behind the front end of the outer cover 4 as shown in FIG. 1(A).

Figure 2C:
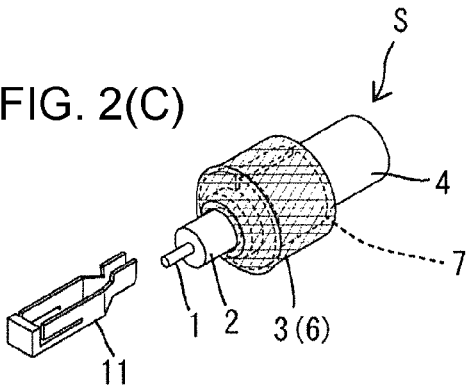

After the mounting of the ring 7 is completed as described above, the braided wire 3 is folded onto the outer cover 4, i.e. the braided-wire folded portion 6 is formed (state of FIG. 2(C)). At that time, the braided-wire folded portion 6 extends back after passing over the outside of the hooking edge 9 of the ring 7 and reaches a position near the rear end of the ring 7. That is, the ring 7 is substantially entirely covered by the braided-wire folded portion 6.

Figure 2D:
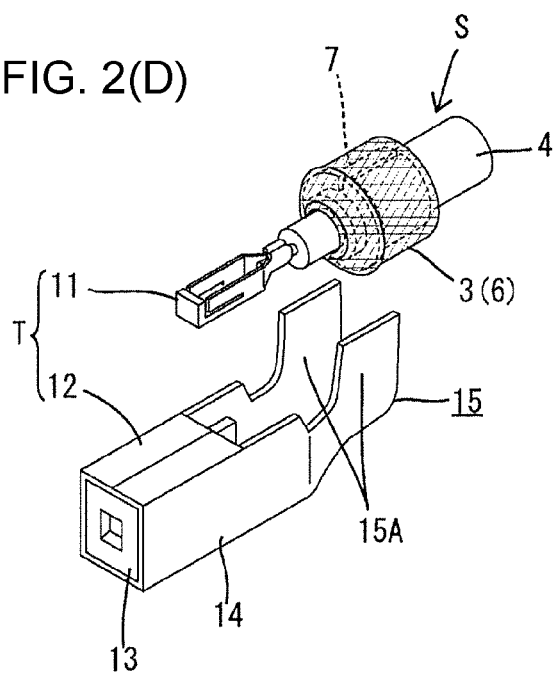
Figure 2E:
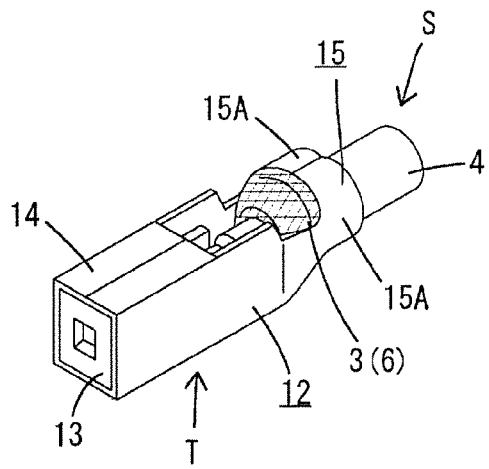

As shown in FIGS. 2(C) and 2(D), the terminal fitting T of this embodiment is configured to include an inner conductor terminal 11, an outer conductor terminal 12 to be grounded and an insulator 13 mounted into the outer conductor terminal 12 and having the inner conductor terminal 11 fitted thereinto. The inner conductor terminal 11 is crimped and connected to the core 1 exposed by removing a tip part of the inner cover 2. A connecting portion 14 in the form of a rectangular tube is formed in a front half of the outer conductor terminal 12, the insulator 13 is retained and mounted in the outer conductor terminal 12, and the inner conductor terminal 11 is retained and fitted in the insulator 13. A barrel 15 connected to the connecting portion 14 is formed in a rear half of the outer conductor terminal 12.

The barrel 15 includes two barrel pieces 15A formed to face each other in a width direction. The barrel pieces 15A are formed to extend obliquely to be wider apart toward tip sides in a natural state. The barrel pieces 15A are crimped so that their tips butt against each other substantially along a straight line in a front-back direction, thereby forming a substantially cylindrical shape. Further, the barrel pieces 15A are formed to have a shorter dimension in the front-back direction than that of the main body portion 8 of the ring 7.

Figure 1B:
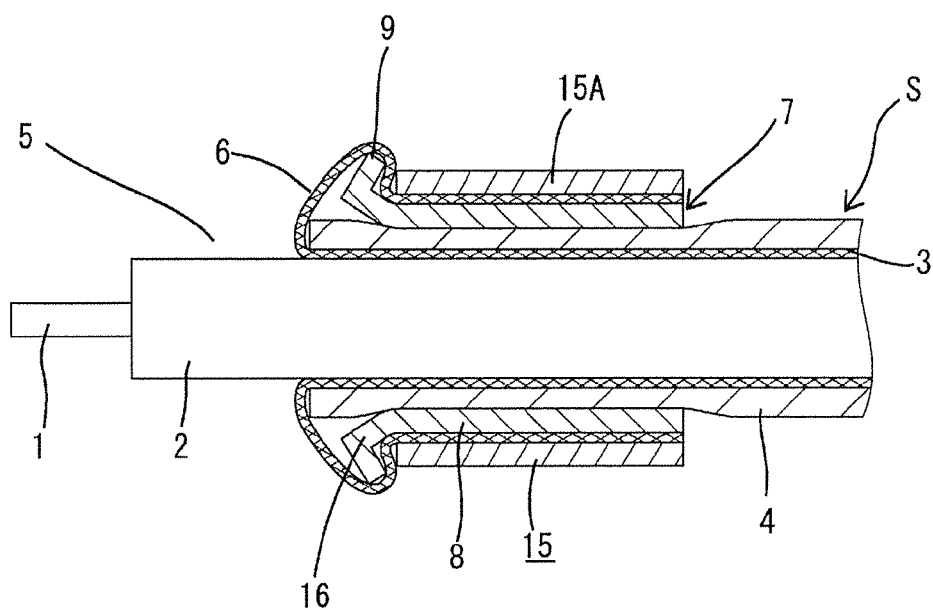
FIG. 1(B) is a section showing a state after the barrel portion is crimped.

When the barrel pieces 15A are crimped to the braided-wire folded portion 6, the positions of the rear ends of the barrel pieces 15A substantially align with the rear end of the ring 7, as shown in FIGS. 1(A) and 1(B). By doing so, the front end positions of the barrel pieces 15A are adjusted to be at a fixed distance from the ring 7. In a state immediately before the crimping of the barrel pieces 15A is completed (state shown in FIG. 1(A)), the folded braided wire 3 is pushed lightly down and in after passing over the hooking edge 9. A strong crimping force is applied to the barrel pieces 15A in this state.

Then, as the barrel pieces 15A are crimped, the crimping force acts on the ring 7 via the braided-wire folded portion 6. Thus, a front end part (part exposed forwardly of the barrel pieces 15A) of the ring 7 including the hooking edge 9 is deformed to be lifted up substantially over the entire circumference. As a result, the front end part of the ring 7 is widened in a horn-like manner, thereby forming a bell-mouth 16. Specifically, as the bell-mouth 16 is formed, the hooking edge 9 is separated radially outwardly from the outer cover 4. Thus, the braided-wire folded portion 6 is hooked to the hooking edge 9 in a more tense state by that much, so that relative displacements of the braided-wire folded portion 6 and the ring 7 in the axial direction can be avoided. Therefore, the terminal fitting T is held reliably on the shield wire S.

Further, this embodiment has the following effect. Specifically, since the split groove 10 is provided over the entire length on the ring 7, the ring 7 can be fit laterally to the outer cover 4 of the shield wire S. If the ring 7 merely is formed into a cylindrical shape without providing the split groove 10, it is cumbersome to fit the ring 7 to the shield wire S along the axial direction from the tip of the shield wire S. However, in this embodiment, the ring 7 can be fit easily to the outer cover 4 by widening the split groove 10 of the ring 7, which contributes to an improvement in operability.

Further, in this embodiment, the rear end position of the ring 7 substantially aligns with those of the barrel pieces 15A when crimping the ring 7. By doing so, the ring 7 and the barrel pieces 15A are relatively positioned in the front back direction. That is, the front end positions of the barrel pieces 15A with respect to the ring 7 are determined. Thus, a position where the front end part of the ring 7 is lifted up as the barrel pieces 15A are crimped is determined, so that the bell-mouth 16 has a stable shape. This leads to the stability of a holding force of the terminal fitting T onto the shield wire S.

Figure 3A:
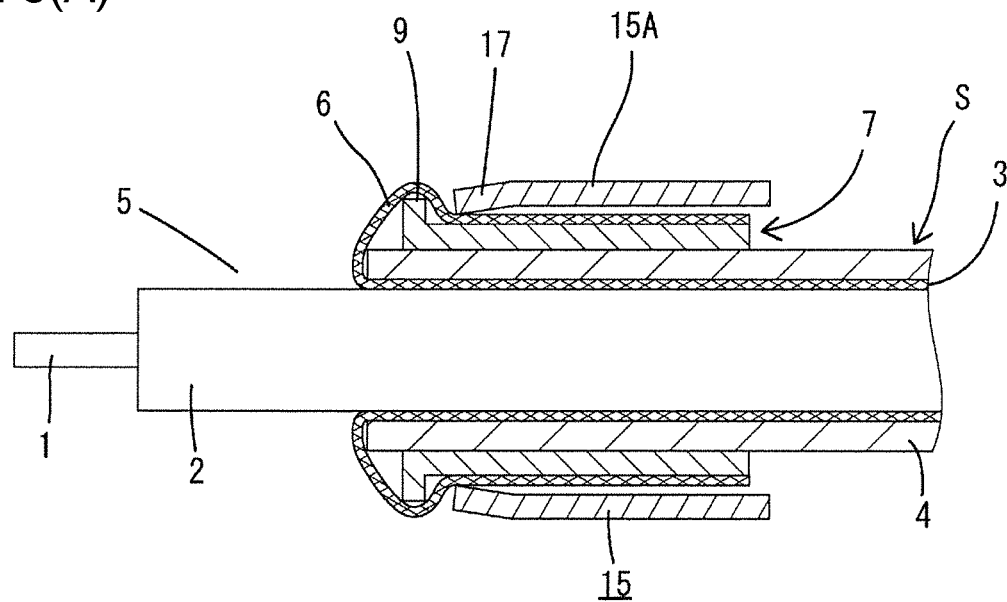
FIG. 3(A) is a section of a second embodiment showing a state immediately before a barrel portion of an outer conductor is crimped to a shield wire.
Figure 3B:
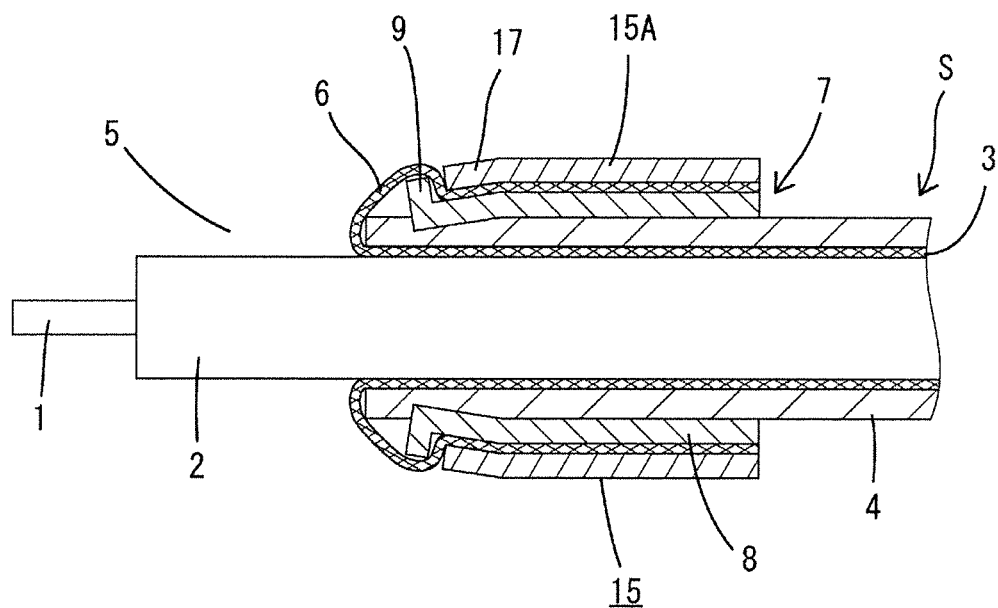
FIG. 3(B) is a section showing a state after the barrel portion is crimped.

FIGS. 3(A) and 3(B) show a second embodiment of the present invention. In this embodiment, a barrel 15 of an outer conductor terminal 12 is formed with a narrow portion 17 in advance. By pushing down a braided-wire folded portion 6 as crimping is performed, a braided wire 3 is hooked to a hooking edge 9 in a strongly tense state.

Specifically, prior to crimping, front edge sides of both side edges of both barrel pieces 15A in the outer conductor terminal 12 are bent obliquely in, so that the barrel pieces 15A form the aforementioned narrow portion 17 when embracing the folded braided-wire folded portion 6 during the crimping operation. A part of a ring 7 corresponding to the narrow portion 17 is deformed and narrowed in outer diameter as the barrel pieces 15A are crimped and bites in an outer cover 4.

Since the braided-wire folded portion 6 is narrowed in a diameter reducing direction at the narrow portion 17 after passing over the hooking edge portion 9 of the ring member 7 in this way, it is hooked to the hooking edge 9 in a strongly tense state. Thus, a folding force of the terminal fitting T onto a shield wire S can be enhanced.

Note that the other configuration is similar to the first embodiment and can exhibit similar functions and effects.

Figure 4:
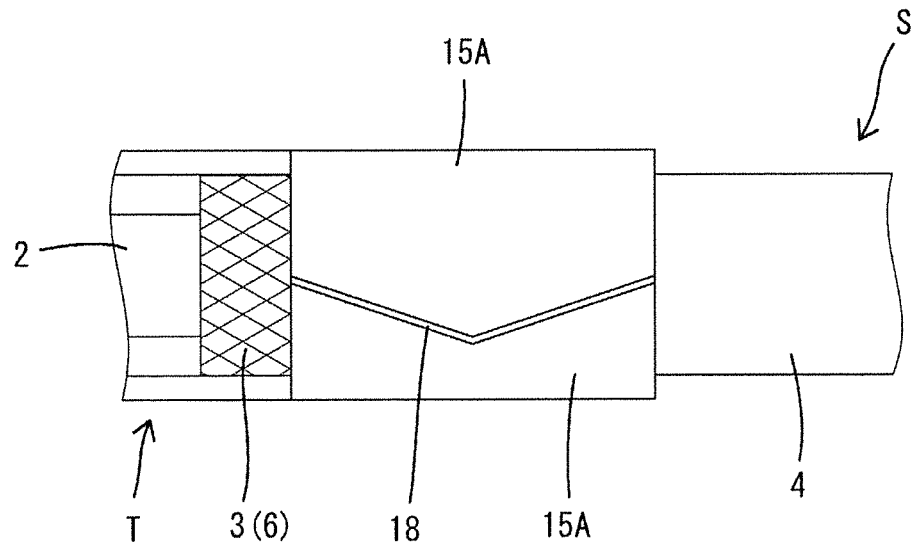
FIG. 4 is a plan view showing a modification of the barrel portion.

FIG. 4 shows a modification of the barrel 15. Although a slit 18 formed when the tips of the barrel pieces 15A butt against each other extends in the front back direction in the first and second embodiments, a slit 18 forms a substantially V shape in an axial direction in the barrel shown in FIG. 4. In other words, the slit 18 is formed to intersect with a folding direction of the braided wire 3.

If the braided-wire folded portion 6 is an end part of the braided wire 3, a braided state easily would be released to cause fraying. In such a case, if the slit 18 extends in the front back direction, an extending direction of the slit 18 and an extending direction of frayed strands match. Thus, the strands easily protrude from the slit 18. In that respect, if the slit 18 is formed in a direction intersecting with the folding direction of the braided wire 3 as shown in FIG. 4, the protrusion of the frayed strands can be effectively avoided.

Figure 5:
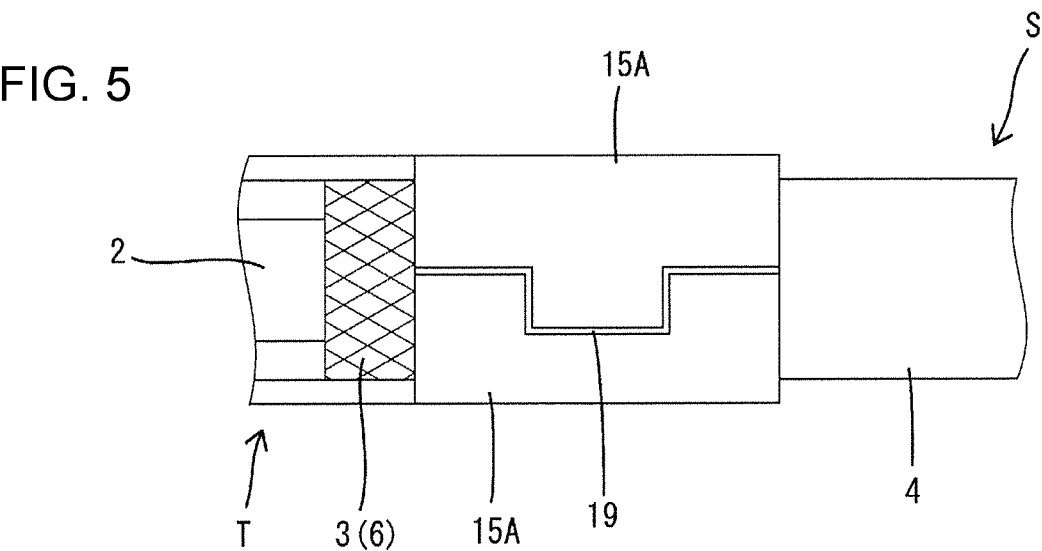
FIG. 5 is a plan view showing another modification of the barrel portion.

FIG. 5 shows another modification of the barrel 15. In FIG. 5, a slit 19 is formed into a crank shape, thereby forming parts intersecting with the folding direction of the braided wire 3 before and after a detour part. The protrusion of the frayed strands can be effectively avoided also by such a shape of the slit 19.

The invention is not limited to the above described and illustrated first and second embodiments. For example, the following embodiments also are included in the scope of the invention.

Although the bell-mouth 16 is formed on the front end part of the ring member 7 as the barrel 15 is crimped in the above first embodiment, it is also possible not to form the bell-mouth 16 during crimping. Even if the ring 7 is formed in such a manner, a sufficient holding force of the terminal fitting T onto the shield wire S can be obtained if a projection height of the hooking edge 9 is set properly.

Although the hooking edge 9 of the ring 7 is formed along the entire circumference in the above embodiments, it may be partially formed. In such a case, the hooking edge 9 may open the mesh of the braided wire 3 to project outwardly.

Although the hooking edge 9 is bent substantially at a right angle to the main body in the above embodiments, it may be bent obliquely, i.e. at an angle larger than 90° so that the tip faces in the folding direction of the braided-wire folded portion 6.

Although the slit 18, 19 where the barrel pieces 15A butt against each other is V-shaped or crank-shaped in FIG. 4 or 5, such shapes of the slit may also be applied to the split groove 10 of the ring 7.

LIST OF REFERENCE SIGNS

2 . . . inner cover
3 . . . braided wire
4 . . . outer cover
5 . . . outer-cover removed portion
6 . . . braided-wire folded portion
7 . . . ring
8 . . . main body
9 . . . hooking edge
10 . . . split groove
15 . . . barrel
15A . . . barrel piece
16 . . . bell-mouth
17 . . . narrow portion
18 . . . slit
S . . . shield wire
T . . . terminal fitting

The invention claimed is:

1. A shield wire with terminal fitting in which a terminal fitting is mounted on an end part of a shield wire having a braided wire interposed between an outer cover and an inner cover, comprising:
    an outer-cover removed portion configured to expose the braided wire by having an end part of the outer cover removed;
    a ring made of electrically conductive metal and including a main body formed into a substantially tubular shape with all of the main body of the ring being fit to an outer peripheral surface of a part of the outer cover near the outer-cover removed portion, a hooking edge formed to project outwardly while extending in a circumferential direction on a tip part of the main body;
    a braided-wire folded portion formed by folding a part of the braided wire exposed at the outer-cover removed portion onto the outer peripheral surface side of the ring beyond the hooking edge; and
    a barrel formed on the terminal fitting and crimped against an outer peripheral surface of the braided-wire folded portion at a position corresponding to the main body of the ring so that the crimped terminal fitting deforms the braided-wire folded portion and the main body of the of the ring inward to compress the outer cover radially inward for strengthening a holding of the terminal fitting on the shield wire.

2. The shield wire with terminal fitting of claim 1, wherein a split groove is provided over the entire length on a side surface of the ring and the ring is formed to fit to the shield wire in a direction intersecting an axial direction of the shield wire.

3. The shield wire with terminal fitting of claim 1, wherein the barrel is formed by two barrel pieces and is formed into a substantially tubular shape by butting leading edges of the barrel pieces against each other over the entire length when being crimped to tighten the braided-wire folded portion, and a slit formed between the butting leading edges of the barrel pieces includes a part extending in a direction intersecting a longitudinal direction of the shield wire.

4. A shield wire with terminal fitting in which a terminal fitting is mounted on an end part of a shield wire having a braided wire interposed between an outer cover and an inner cover, comprising:
    an outer-cover removed portion configured to expose the braided wire by having an end part of the outer cover removed;
    a ring made of electrically conductive metal and including a main body formed into a substantially tubular shape fittable to an outer peripheral surface of a part of the outer cover near the outer-cover removed portion and a hooking edge formed to project outwardly while extending in a circumferential direction on a tip part of the main body;

a braided-wire folded portion formed by folding a part of the braided wire exposed at the outer-cover removed portion onto the outer peripheral surface side of the ring beyond the hooking edge; and a barrel formed on the terminal fitting and to be crimped to tighten an outer peripheral surface of the braided-wire folded portion at a position corresponding to the main body of the ring, wherein an end part of the ring including the hooking edge portion is widened and deformed into a horn shape to form a bell-mouth as the barrel is crimped.

5. The shield wire with terminal fitting of claim 4, wherein rear end positions of the barrel and the ring member are substantially aligned in a folding direction of the braided-wire folded portion.

6. A shield wire with terminal fitting in which a terminal fitting is mounted on an end part of a shield wire having a braided wire interposed between an outer cover and an inner cover, comprising:

an outer-cover removed portion configured to expose the braided wire by having an end part of the outer cover removed;

a ring made of electrically conductive metal and including a main body formed into a substantially tubular shape fittable to an outer peripheral surface of a part of the outer cover near the outer-cover removed portion and a hooking edge formed to project outwardly while extending in a circumferential direction on a tip part of the main body;

a braided-wire folded portion formed by folding a part of the braided wire exposed at the outer-cover removed portion onto the outer peripheral surface side of the ring beyond the hooking edge; and a barrel formed on the terminal fitting and to be crimped to tighten an outer peripheral surface of the braided-wire folded portion at a position corresponding to the main body of the ring, wherein an end part of the barrel on a side corresponding to the hooking edge is bent inwardly along a circumferential direction to form a narrow portion.

* * * * *